US011153465B2

(12) United States Patent
Tran et al.

(10) Patent No.: US 11,153,465 B2
(45) Date of Patent: Oct. 19, 2021

(54) SYSTEM AND METHOD OF PROCESSING VIDEO OF A TILEABLE WALL

(71) Applicant: Dell Products L.P., Round Rock, TX (US)

(72) Inventors: Thanh T. Tran, Houston, TX (US); Philip Seibert, Austin, TX (US)

(73) Assignee: Dell Products L.P., Round Rock, TX (US)

(*) Notice: Subject to any disclaimer, the term of this patent is extended or adjusted under 35 U.S.C. 154(b) by 20 days.

(21) Appl. No.: 15/629,174

(22) Filed: Jun. 21, 2017

(65) Prior Publication Data
US 2018/0376035 A1 Dec. 27, 2018

(51) Int. Cl.
*H04N 5/14* (2006.01)
*H04N 5/232* (2006.01)
*G06T 15/20* (2011.01)
*G06T 7/593* (2017.01)
*H04N 5/357* (2011.01)
*G01S 3/00* (2006.01)
*H04N 7/14* (2006.01)
*H04N 7/15* (2006.01)
*H04N 5/247* (2006.01)

(52) U.S. Cl.
CPC ............ *H04N 5/145* (2013.01); *G01S 3/00* (2013.01); *G06T 7/593* (2017.01); *G06T 15/205* (2013.01); *H04N 5/232* (2013.01); *H04N 5/23238* (2013.01); *H04N 5/247* (2013.01); *H04N 5/3572* (2013.01); *H04N 7/142* (2013.01); *H04N 7/157* (2013.01); *G06T 2207/10012* (2013.01); *G06T 2207/10016* (2013.01)

(58) Field of Classification Search
CPC ............ H04N 5/2251; H04N 5/23218; H04N 5/23293; H04N 5/23238; H04N 13/271; H04N 2013/0081; H04N 5/2259; H04N 5/2628; H04N 13/243; H04N 2007/145; H04N 21/4305; H04N 2201/0084; H04N 5/2254; H04N 5/232; H04N 5/23219; H04N 5/247; H04N 5/272
See application file for complete search history.

(56) References Cited

U.S. PATENT DOCUMENTS

| | | | |
|---|---|---|---|
| 7,429,949 B1* | 9/2008 | Trigui | H01Q 3/30 342/372 |
| 2005/0128291 A1* | 6/2005 | Murakami | H04N 7/181 348/143 |

(Continued)

*Primary Examiner* — Samira Monshi
(74) *Attorney, Agent, or Firm* — Baker Botts L.L.P.

(57) ABSTRACT

In one or more embodiments, one or more systems, processes, and/or methods may receive first video streams, of a user, from respective first cameras, at respective first locations and construct, from the first video streams, a single video stream that includes forward-facing images of the user. The single video stream constructed from the first video streams may be provided to a network. One or more movements of the user may be tracked, and based on the tracking, a hand-off to second cameras may occur. The one or more systems, processes, and/or methods may receive second video streams, of the user, from respective second cameras, at respective second locations and construct, from the second video streams, the single video stream that includes forward-facing images of the user. The single video stream constructed from the second video streams may be provided to the network.

16 Claims, 7 Drawing Sheets

(56) References Cited

U.S. PATENT DOCUMENTS

| | | | | |
|---|---|---|---|---|
| 2008/0129825 A1* | 6/2008 | DeAngelis | ......... | H04N 5/23299 |
| | | | | 348/169 |
| 2013/0207895 A1* | 8/2013 | Lee | ........................ | G06F 3/012 |
| | | | | 345/158 |
| 2015/0199305 A1* | 7/2015 | Li | ........................... | G06F 3/042 |
| | | | | 715/273 |
| 2015/0346814 A1* | 12/2015 | Thukral | ............... | G06K 9/0061 |
| | | | | 345/156 |
| 2016/0198140 A1* | 7/2016 | Nadler | ................. | H04N 21/816 |
| | | | | 348/43 |
| 2017/0019627 A1* | 1/2017 | Wan | ........................ | G06T 7/285 |
| 2017/0351327 A1* | 12/2017 | Yasuda | ................... | G06F 3/012 |
| 2018/0087903 A1* | 3/2018 | Werner | .................. | G01C 21/14 |
| 2019/0149807 A1* | 5/2019 | Akao | .................... | G06T 15/205 |
| | | | | 348/54 |

\* cited by examiner

SYSTEM AND METHOD OF PROCESSING VIDEO OF A TILEABLE WALL

BACKGROUND

Field of the Disclosure

This disclosure relates generally to video processing systems and more particularly to providing events of information handling systems to one or more subscribers.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. In the past, camera-captured video of a video collaboration or video conferencing system can be distorted if a presenter in a field of view of a camera is too close to the camera. Moreover, the video collaboration or video conferencing system may not track the presenter as the presenter in front of a first monitor and moves to a second monitor.

SUMMARY

In one or more embodiments, one or more systems, processes, and/or methods may receive first video streams, of a user, from respective first cameras, at respective first locations, and construct, from the first video streams, a single video stream that includes first forward-facing images of the user. For example, the single video stream constructed from the first video streams may be provided to a network. For instance, the single video stream constructed from the first video streams may be provided to a video conferencing system via the network.

In one or more embodiments, the one or more systems, processes, and/or methods may track one or more movements of the user. In one example, tracking the one or more movements of the user may include receiving first sounds from the user, receiving second sounds from the user, and determining a direction of movement based on the first sounds and the second sounds. For instance, tracking the one or more movements of the user may include utilizing at least one of triangulation and trilateration, among others. In a second example, tracking the one or more movements of the user may include utilizing at least one of beamforming and spatial filtering, among others. In a third example, tracking the one or more movements of the at least one user may include tracking a face of the user. In a fourth example, tracking the one or more movements of the user may include utilizing at least one motion vector. In another example, tracking one or more movements of the user may include determining at least one motion vector from a first image from a first video stream of the first streams and a second image from the first video stream of the first video streams.

In one or more embodiments, the one or more systems, processes, and/or methods may receive second video streams, of the user, from respective second cameras, at respective second locations, and construct, from the second video streams, the single video stream that includes second forward-facing images of the user. For example, the single video stream constructed from the second video streams may be provided to a network. For instance, the single video stream constructed from the second video streams may be provided to a video conferencing system via the network.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
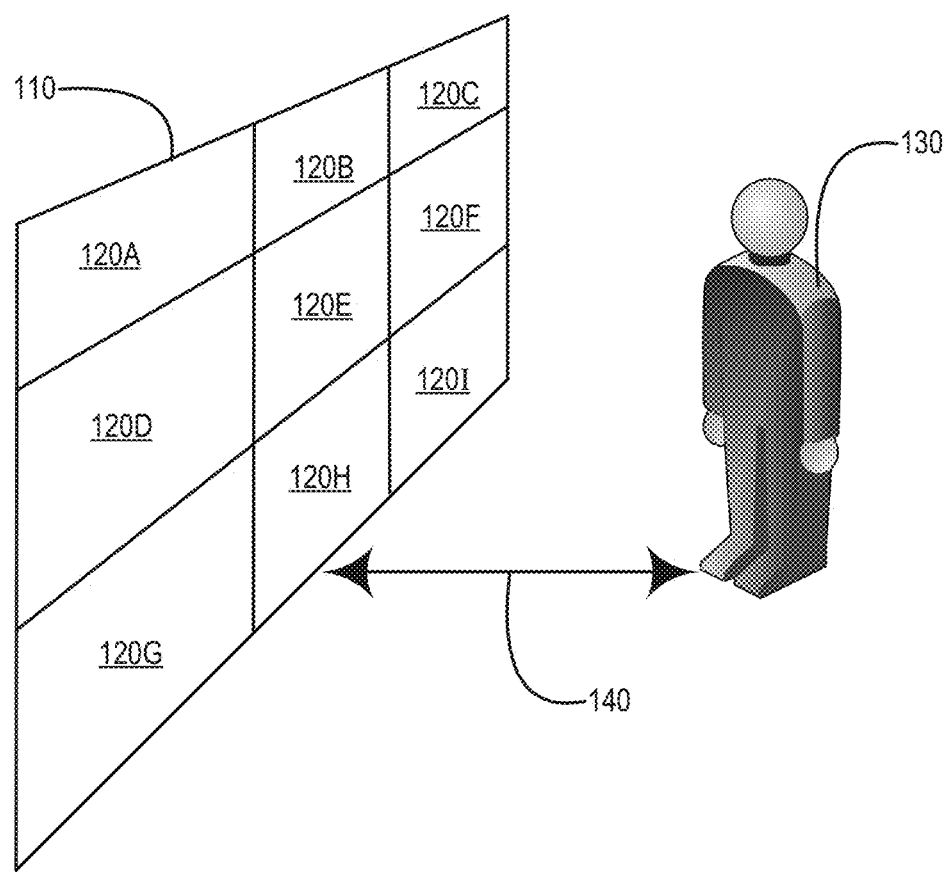
FIGS. 1A-1D illustrate an exemplary a video system, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12' and any one of which may be referred to generically as a device '12'.

In one or more embodiments, each of multiple cameras of a video system may capture a view in real-time. For example, a front-facing camera may capture images of a front view of a monitor of the video system, and side cameras may capture images of respective side views of the monitor of the video system. In one or more embodiments, an identification may be assigned to captured images a presenter in front of a camera. For example, one or more face-tracking processes and/or one or more depth detection processes may be utilized to assign the identification. For instance, the identification may be assigned to a presenter that is closest to a monitor of the video system. In one or more embodiments, cameras may be mounted around a monitor of the video system (e.g., around and/or proximate to a perimeter of the monitor). For example, the cameras may capture multiple views of a presenter in front of the monitor. In one or more embodiments, a video stitching process and/or method may utilize the multiple views of the presenter in front of the monitor to produce and/or construct forward-facing images of the presenter in real-time.

In one or more embodiments, microphones around monitors of the video system may be utilized in tracking one or more movements of the presenter as the presenter moves from a first monitor of the video system to a second monitor of the video system. In one example, beamforming may be utilized in tracking a voice of the presenter as the presenter moves from the first monitor of the video system to the second monitor of the video system. In another example, triangulation may be utilized in tracking the voice of the presenter as the presenter moves from the first monitor of the video system to the second monitor of the video system. In one or more embodiments, the presenter may not produce one or more sounds as the presenter moves from the first monitor of the video system to the second monitor of the video system, and a video coding process, system, and/or method may be utilized in generating one or more motion vectors that may be utilized in determining one or more movements of the presenter.

Figure 1B:
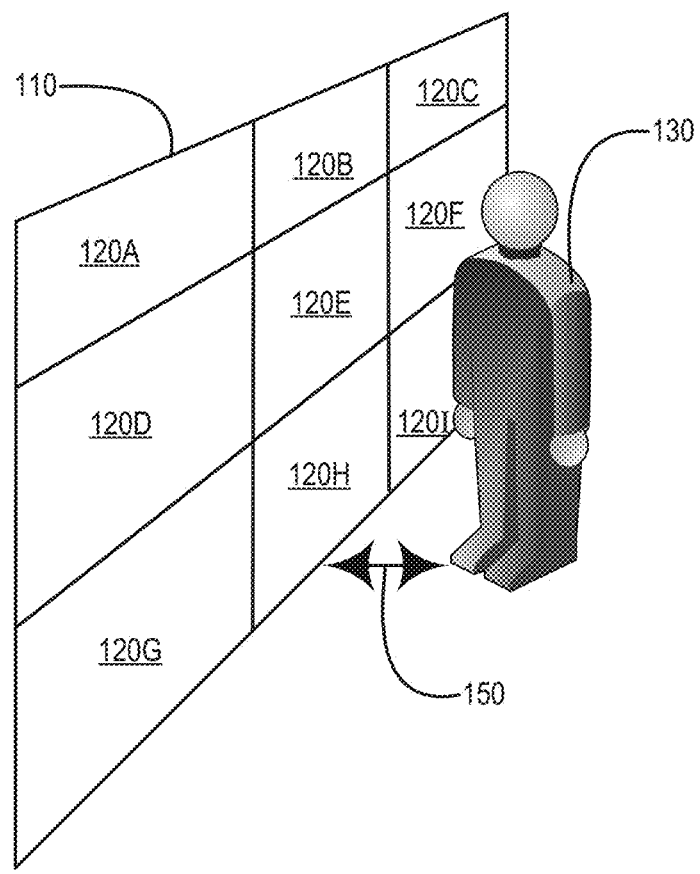
Figure 1C:
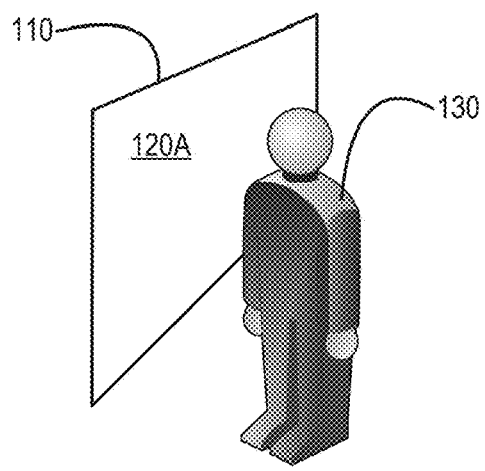

Turning now to FIGS. 1A-1D, a video system is illustrated, according to one or more embodiments. As shown in FIG. 1A, a video system 110 may include screens 120A-120I. As illustrated, a user 130 (e.g., a presenter) may be at a distance 140 from video system 110. In one or more embodiments, when user 130 is at distance 140 from video system 110, one or more cameras of video system 110 may not produce one or more distorted images of user 130 or a portion of user 130 (e.g., a face of user 130). As shown in FIG. 1B, user 130 may be at a distance 150 from video system 110. For example, distance 150 may be less than distance 140. In one or more embodiments, when user 130 is at or within distance 150 from video system 110, one or more cameras of video system 110 may produce one or more distorted images of user 130 or a portion of user 130 (e.g., a face of user 130). For example, one or more distorted images of user 130 or the portion of user 130 may include a fish-eye effect, among others. In one or more embodiments, non-distorted images of user 130 or the portion of user 130 may be produced and/or constructed via one or more systems, methods, and/or processes described herein. In one or more embodiments, when user 130 is at or within distance 150 from video system 110, one or more cameras of video system 110 may produce one or more incomplete images of user 130 or a portion of user 130 (e.g., a face of user 130). For example, one or more incomplete images of user 130 may include a portion of user 130, among others. In one instance, video system 110 may determine if one or more incomplete images of user 130 include a portion of user 130. In another instance, video system 110 may utilize one or more computer vision systems, methods and/or processes in determining if one or more incomplete images of user 130 include a portion of user 130. In one or more embodiments, complete images of user 130 may be produced and/or constructed via one or more systems, methods, and/or processes described herein. As illustrated in FIG. 1C, video system 110 may include a single screen 120A.

Figure 1D:
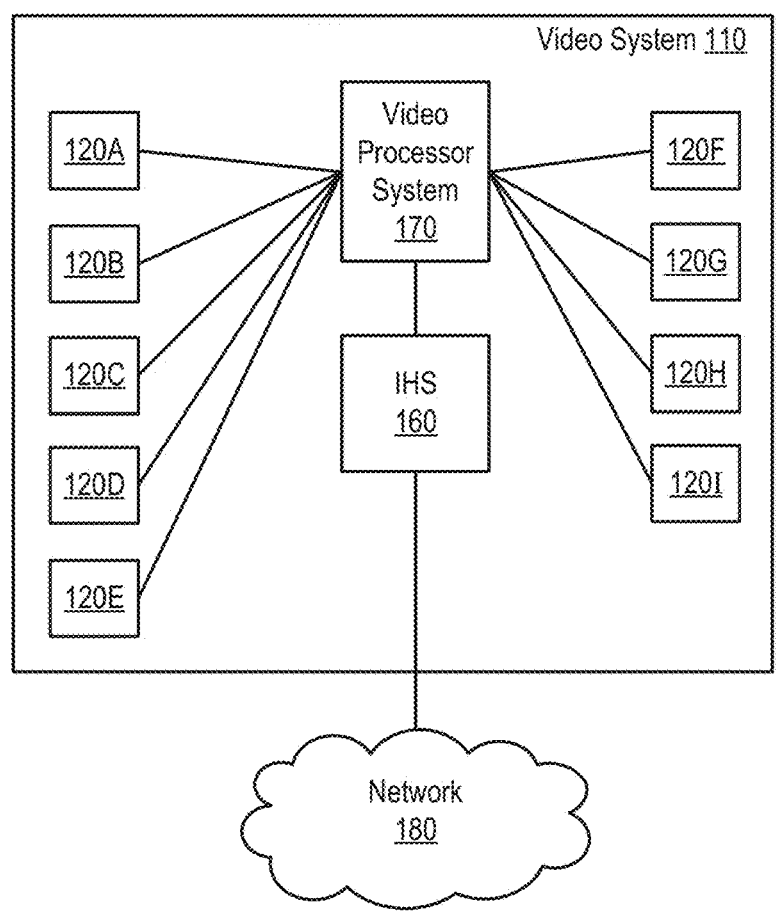

As shown in FIG. 1D, video system 110 may include an information handling system (IHS) 160, a video processor system 170, and screens 120A-120I. As illustrated, screens 120A-120I may be coupled to video processor system 170, and video processor system 170 may be coupled to IHS 160. In one or more embodiments, IHS 160 may include video processor system 170. As shown, IHS 160 may be coupled to a network 180. In one or more embodiments, network 180 may include a wired network, a wireless network, an optical network, or a combination of the foregoing, among others. For example, network 180 may include and/or be coupled to various types of communications networks. For instance, network 420 may include and/or be coupled to a local area network (LAN), a wide area network (WAN) (e.g., a private WAN, a corporate WAN, a public WAN, etc.), an Internet, a public switched telephone network (PSTN), a cellular telephone network, a satellite telephone network, or a combination of the foregoing, among others. In one or more embodiments, one or more of video system 110 and IHS 160 may be coupled to one or more of another video system, a video conferencing system, and another IHS, among others, via network 180.

Figure 2A:
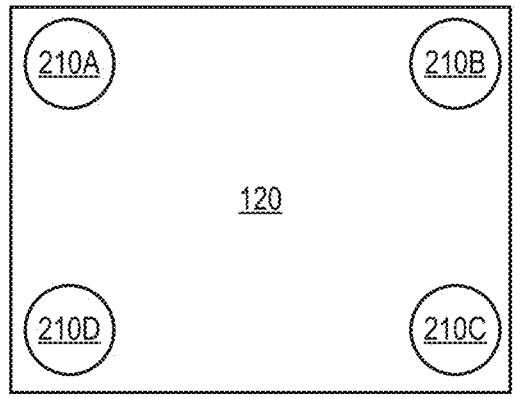
FIG. 2A illustrates an exemplary screen and exemplary cameras, according to one or more embodiments.

Turning now to FIG. 2A, a screen and cameras are illustrated, according to one or more embodiments. As shown, cameras 210A-210D may be located at corners of screen 120 or proximate to corners of screen 120. In one or more embodiments, one or more of cameras 210A-210D may be angled and/or positioned towards a center of screen 120. In one or more embodiments, one or more of cameras 210A-210A may be angled and/or positioned in a direction of screen 120 (e.g., in a direction of a direct viewing angle of screen 120).

For example, one or more of cameras 210A-210D may acquire and/or capture one or more images of user 130, among others. In one or more embodiments, one or more of cameras 210A-210D may be coupled to video processor system 170 and/or provide respective one or more video streams to video processor system 170. For example, the one or more video streams may be based on images captured by respective one or more of cameras 210A-210D.

In one or more embodiments, a user may be moving proximate to a screen. For example, user 130 may be moving proximate to screen 120. In one or more embodiments, the user may be tracked while moving proximate to the screen. For example, video system 110 may track user 130 moving proximate to screen 120.

In one or more embodiments, tracking the movement of user 130 may include utilizing one or more of triangulation and trilateration, among others. For example, camera 210 may include a microphone or the microphone may be proximate to camera 210. In one or more embodiments, respective microphones associated with cameras 210A-210D may be coupled to video processor system 170, and video system 110 may receive signals based on one or more sounds received by the respective microphones. In one example, video system 110 may utilize one or more intensities of the signals in tracking user 130 via one or more of triangulation and trilateration, among others. In another example, video system 110 may utilize one or more of reception times and/or timings of the signals in tracking user 130 via one or more of triangulation and trilateration, among others. In one instance, first sounds may be received at a first time, second sounds may be received at a second time, and a direction of movement of user 130 based on the first sounds and the second sounds may be determined. In another instance, first signals based on first sounds may be received at a first time, second signals based on second sounds may be received at a second time, a direction of movement of user 130 based on the first sounds and the second sounds may be determined.

In one or more embodiments, tracking the movement of user 130 may include utilizing tracking a face of a user. For example, a computer vision system, process, and/or method may be utilized in tracking a face of user 130. In one or more embodiments, tracking the movement of the user may include utilizing one or more of beamforming and spatial filtering, among others. For example, utilizing the one or more of beamforming and spatial filtering may include utilizing directional sound reception. For instance, the respective microphones of cameras 210A-210D may be configured such that the respective microphones of cameras 210A-210D may determine or may be utilized in determining one or more directions of reception of one or more sounds.

In one or more embodiments, tracking the movement of user 130 may include utilizing one or more motion vectors. In one example, a motion vector may be determined via a transformation from a first image to a second image. For instance, a video stream and/or a video sequence may include the first image and the second image, among others. In another example, a motion vector may be determined via one or more of a phase correlation process and/or method, a corner detection process and/or method, among others, a block-matching method and/or process, an optical flow process and/or method, and a pixel recursive process and/or method, among others.

Figure 2B:
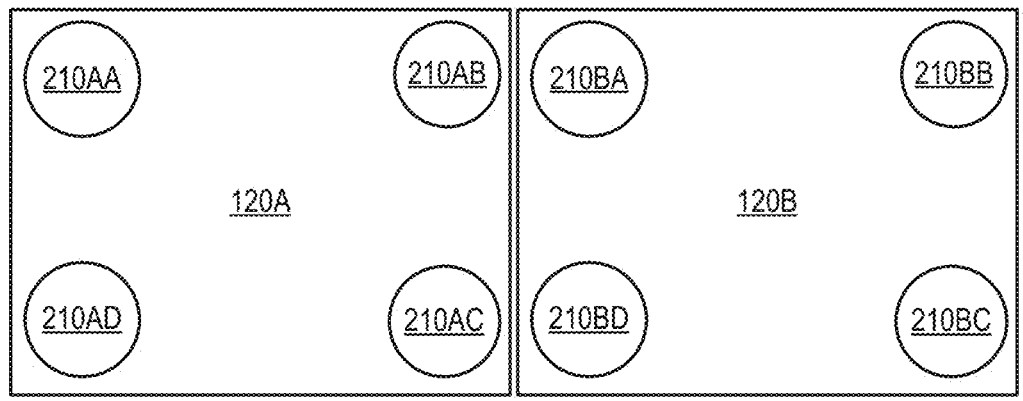
FIG. 2B illustrates exemplary multiple screens and cameras, according to one or more embodiments.

Turning now to FIG. 2B, multiple screens and cameras are illustrated, according to one or more embodiments. As shown, cameras 210AA-210AD may be located at corners of screen 120A or proximate to corners of screen 120A, and cameras 210BA-210BD may be located at corners of screen 120B or proximate to corners of screen 120B. In one or more embodiments, one or more of cameras 210AA-210AD may be angled and/or positioned towards a center of screen 120A, and one or more of cameras 210BA-210BD may be angled and/or positioned towards a center of screen 120B. In one or more embodiments, one or more of cameras 210AA-210AD may be angled and/or positioned in a direction of screen 120A (e.g., in a direction of a direct viewing angle of screen 120A), and one or more of cameras 210BA-210BD may be angled and/or positioned in a direction of screen 120B (e.g., in a direction of a direct viewing angle of screen 120B).

In one example, one or more of cameras 210AA-210AD may acquire and/or capture one or more images of user 130, among others. In another example, one or more of cameras 210BA-210BD may acquire and/or capture one or more images of user 130, among others. In one or more embodiments, one or more of cameras 210AA-210AD and 210BA-210BD may be coupled to video processor system 170 and/or provide respective one or more video streams to video processor system 170. For example, the one or more video streams may be based on images captured by respective one or more of cameras 210AA-210AD and 210BA-210BD.

In one or more embodiments, a user may move from a first screen to a second screen. For example, user 130 may move from screen 120A to screen 120B. In one or more embodiments, the user may be tracked from the first screen to the second screen. For example, user 130 may be tracked from screen 120A to screen 120B. For instance, video system 110 may track user 130 moving from screen 120A to screen 120B.

In one or more embodiments, tracking the user from the first screen to the second screen may include utilizing one or more video streams. For example, video system 110 may determine that one or more video streams, from respective one or more of cameras 210AA-210AD, includes images of user 130, and then, video system 110 may determine that one or more video streams, from respective one or more of cameras 210BA-210BD, includes images of user 130. For instance, determining that images of user 130 are included in one or more video streams from one or more cameras associated with screen 120A (e.g., cameras 210AA-210AD) and that images of user 130 are included in one or more video streams from one or more cameras associated with screen 120B (e.g., cameras 210BA-210BD) may indicate that user 130 has moved from screen 120A to screen 120B.

In one or more embodiments, tracking the movement of user 130 may include utilizing one or more of triangulation and trilateration, among others. For example, camera 210 may include a microphone or the microphone may proximate to camera 210. In one or more embodiments, respective microphones associated with cameras 210AA-210AD and 210BA-210BD may be coupled to video processor system 170, and video system 110 may receive signals based on one or more sounds received by the respective microphones. In one example, video system 110 may utilize one or more of intensities of the signals in tracking user 130 via one or more of triangulation and trilateration, among others. In another example, video system 110 may utilize one or more of reception times and/or timings of the signals in tracking user 130 via one or more of triangulation and trilateration, among others. In one instance, first sounds may be received at a first time, and second sounds may be received at a second time. In another instance, first signals based on first sounds may be received at a first time, and second signals based on second sounds may be received at a second time.

In one or more embodiments, tracking the movement of user 130 may include utilizing tracking a face of a user. For example, a computer vision system, process, and/or method may be utilized in tracking a face of user 130. In one or more embodiments, tracking the movement of the user may include utilizing one or more of beamforming and spatial filtering, among others. For example, utilizing the one or more of beamforming and spatial filtering may include utilizing directional sound reception. For instance, the respective microphones of cameras 210AA-210AD and 210BA-210BD may be configured such that the respective microphones of cameras 210AA-210AD and 210BA-210BD may determine or may be utilized in determining one or more directions of reception of one or more sounds.

In one or more embodiments, tracking the movement of the user may include utilizing one or more motion vectors. In one example, a motion vector may be determined via a transformation from a first image to a second image. For instance, a video stream and/or a video sequence may include the first image and the second image, among others. In another example, a motion vector may be determined via one or more of a phase correlation process and/or method, a corner detection process and/or method, among others, a block-matching method and/or process, an optical flow process and/or method, and a pixel recursive process and/or method, among others.

In one or more embodiments, two or more cameras may be combined. In one example, cameras 210AB and 210BA may be combined into one camera. In another example, cameras 210AC and 210BD may be combined into one camera.

Figure 3:
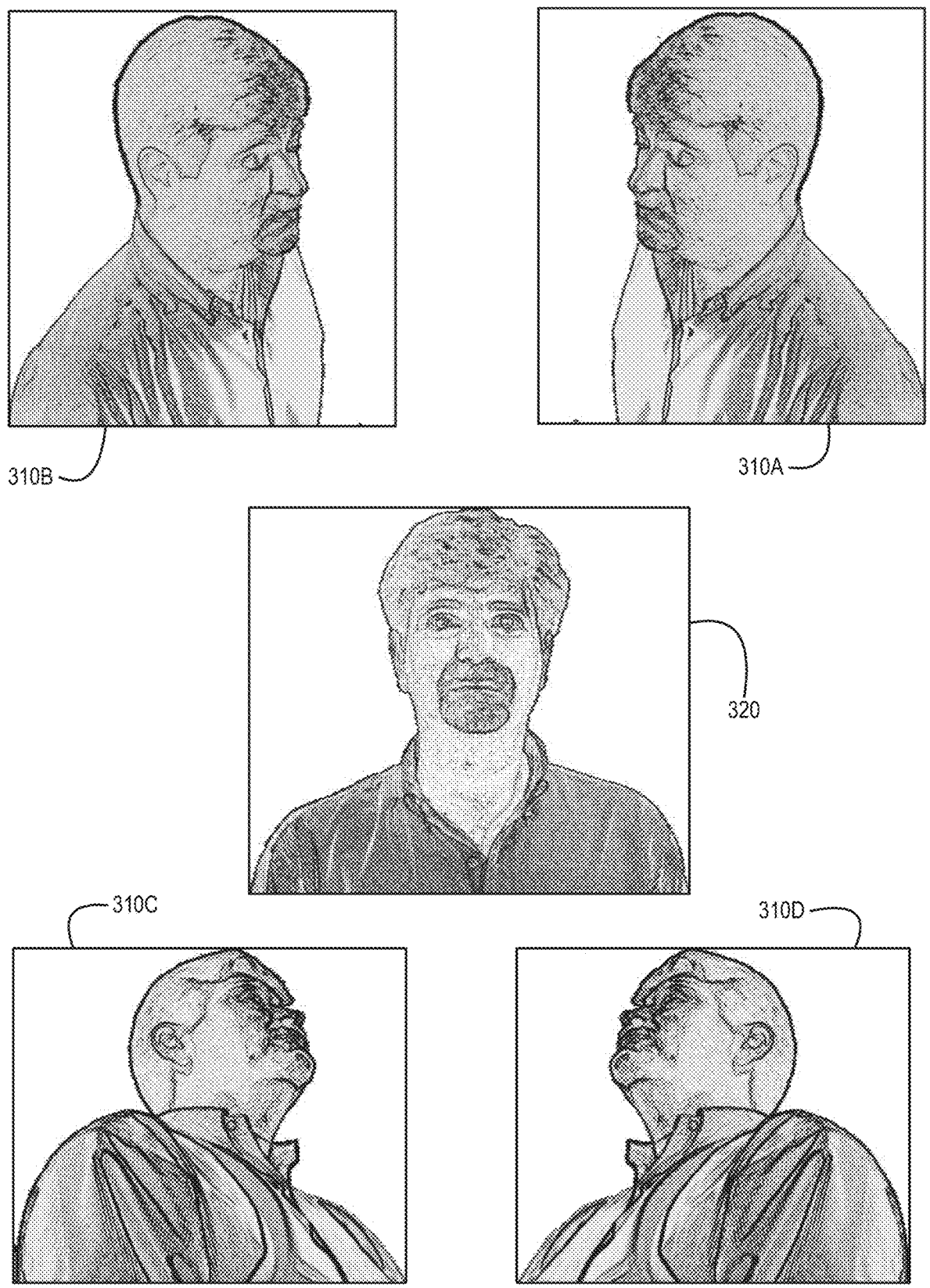
FIG. 3 illustrates an exemplary image constructed via images captured by cameras of a video system, according to one or more embodiments.

Turning now to FIG. 3, an image constructed via images captured by cameras of a video system is illustrated, according to one or more embodiments. Images 310A-310D may be images of user 130. In one example, images 310A-310D may be provided via cameras 210A-210D, respectively. For instance, cameras 210A-210D may be angled from a vector normal to a ventral side of user 130 to produce respective images 310A-310D. In a second example, images 310A-310D may be provided via cameras 210AA-210AD, respectively. For instance, cameras 210AA-210AD may be angled from a vector normal to a ventral side of user 130 to produce respective images 310A-310D. In another example, images 310A-310D may be provided via cameras 210BA-210BD, respectively. For instance, cameras 210BA-210BD may be angled from a vector normal to a ventral side of user 130 to produce respective images 310A-310D.

In one or more embodiments, images 310A-310D may be utilized in producing and/or constructing an image 320. For example, image 320 may be constructed from images 310A-310D. For instance, video processor system 170 may utilize images 310A-310D in producing and/or constructing image 320. In one or more embodiments, images 310A-310D may be respective single frames of respective video streams of user 130. For example, images 310A-310D may be utilized in producing and/or constructing a single frame, of user 130, of a video stream provided to a video system. In one or more embodiments, single frames from cameras 210A-210D, cameras 210AA-210AD, or cameras 210BA-210BD may be utilized in producing single frames of a video stream of user 130. For example, the single frames of the video stream of user 130, from cameras 210A-210D, cameras 210AA-210AD, or cameras 210BA-210BD, may produce and/or construct a forward-facing view of user 130, such as forward facing frame of user 130 shown via image 320.

Figure 4:
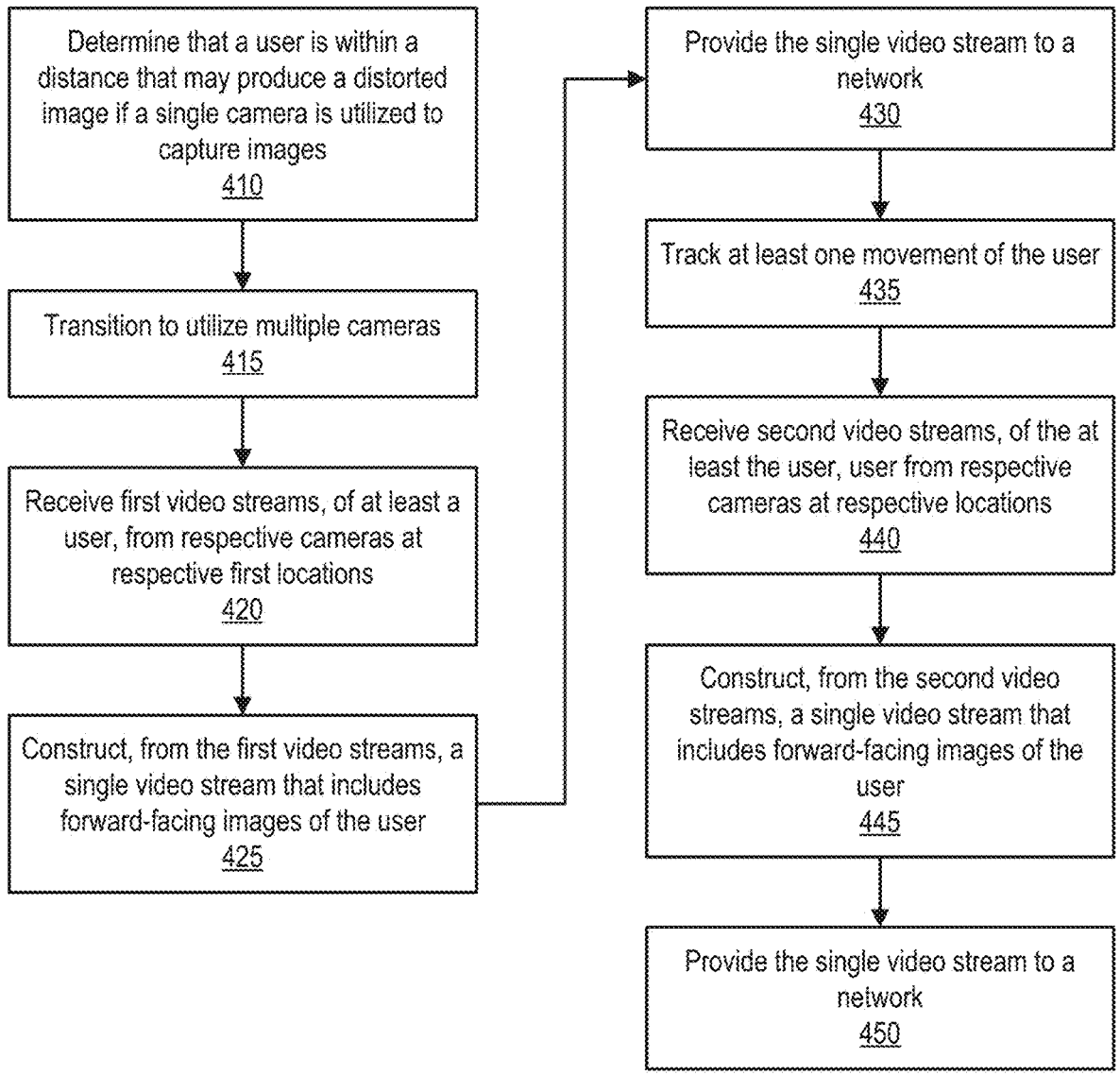
FIG. 4 illustrates an exemplary method of operating a video system, according to one or more embodiments.

Turning now to FIG. 4, a method of operating a video system is illustrated, according to one or more embodiments. At 410, it may be determined that a user is within a distance that may produce a distorted image if a single camera is utilized to capture images. For example, user 130 may be at distance 140 and move to be at or within distance 150, where it may be determined that user 130 is within at or distance 150, which may produce a distorted image if a single camera is utilized to capture images. In one or more embodiments, determining that user 130 is within at or distance 150 may include utilizing one or more beamforming techniques. In one or more embodiments, determining that user 130 is within at or distance 150 may include utilizing one or more camera depth techniques. For example, the one or more camera depth techniques may include measuring illuminated light and/or may include measuring reflected rays, among others.

At 415, transitioning to utilize multiple cameras to capture images may be performed. For example, in response to determining that user 130 is within at or within distance 150, transitioning to utilize multiple cameras to capture images may be performed. In one or more embodiments, transitioning to utilize multiple cameras to capture images may be performed to produce a video stream that may not include one or more distorted images of user 130.

At 420, first video streams, of the user, from respective cameras at respective first locations may be received. For example, video processor system 170 may receive first video streams, of user 130, from respective cameras 210AA-210AD at respective first locations. For instance, the first locations may be or may be associated with corners of screen 120A. In one or more embodiments, the first video streams may include respective first frames. For example, the respective first frames may include images 310A-310D.

At 425, a single video stream may be constructed, from the first video streams, that includes first forward-facing images of the user. For example, video processor system 170 may construct a single video stream, from the first video streams, where the single video stream includes the first forward-facing images user 130. For instance, a frame of the single video stream, constructed from the first video streams, where the single video stream includes the first forward-facing images user 130 may include image 320. In one or more embodiments, constructing the single video stream may include processing the first video streams to remove one or more distortions. For example, video processor system 170 may remove one or more fish-eye effect distortions from one or more of the first video streams. For instance, video processor system 170 may de-warp one or more images of one or more of the first video streams.

At 430, the single video stream, constructed from the first video streams, may be provided to a network. For example, video system 110 may provide the single video stream to network 180. For instance, the single video stream may be provided to one or more of another video system, a video conferencing system, and an IHS, among others, via network 180. In one or more embodiments, the one or more of the other video system, the other video conferencing system, and the other IHS may be or include a virtual reality device, such as a virtual reality headset, glasses, goggles, etc. In one or more embodiments, the other video system or the other video conferencing system may include one or more structures and/or functionalities as those described with reference to video system 110.

At 435, at least one movement of the user may be tracked. In one or more embodiments, video system 110 may track one or more movements of user 130. For example, tracking the one or more movements of user 130 may be utilized in determining that user 130 moved from proximate a first screen to proximate to a second screen. For instance, video system 110 may determine that user 130 moved from proximate screen 120A to proximate to screen 120B, via tracking one or more movements of user 130. In one or more embodiments, when it is determined that user 130 moved from proximate screen 120A to proximate to screen 120B, constructing the single video stream may be handed-off to second video streams from cameras 210BA-210BD. At 440, second video streams, of the user, from respective cameras at respective second locations. For example, video processor system 170 may receive second video streams, of at least user 130, from respective cameras 210BA-210BD at respective second locations. For instance, the second locations may be or may be associated with corners of screen 120B.

At 445, the single video stream may be constructed, from the second video streams, that includes second forward-facing images of the user. For example, video processor system 170 may construct the single video stream, from the second video streams, that include the second forward-facing images user 130. In one or more embodiments, the single video stream may be constructed, from the second video streams, that includes forward-facing images of the user in a same or similar way and/or fashion as described with reference to method element 420. At 450, the single video stream, constructed from the second video streams, may be provided to a network. For example, video system 110 may provide the single video stream to network 180. For instance, the single video stream may be provided to one or more of another video system, a video conferencing system, and an IHS, among others, via network 180.

Figure 5:
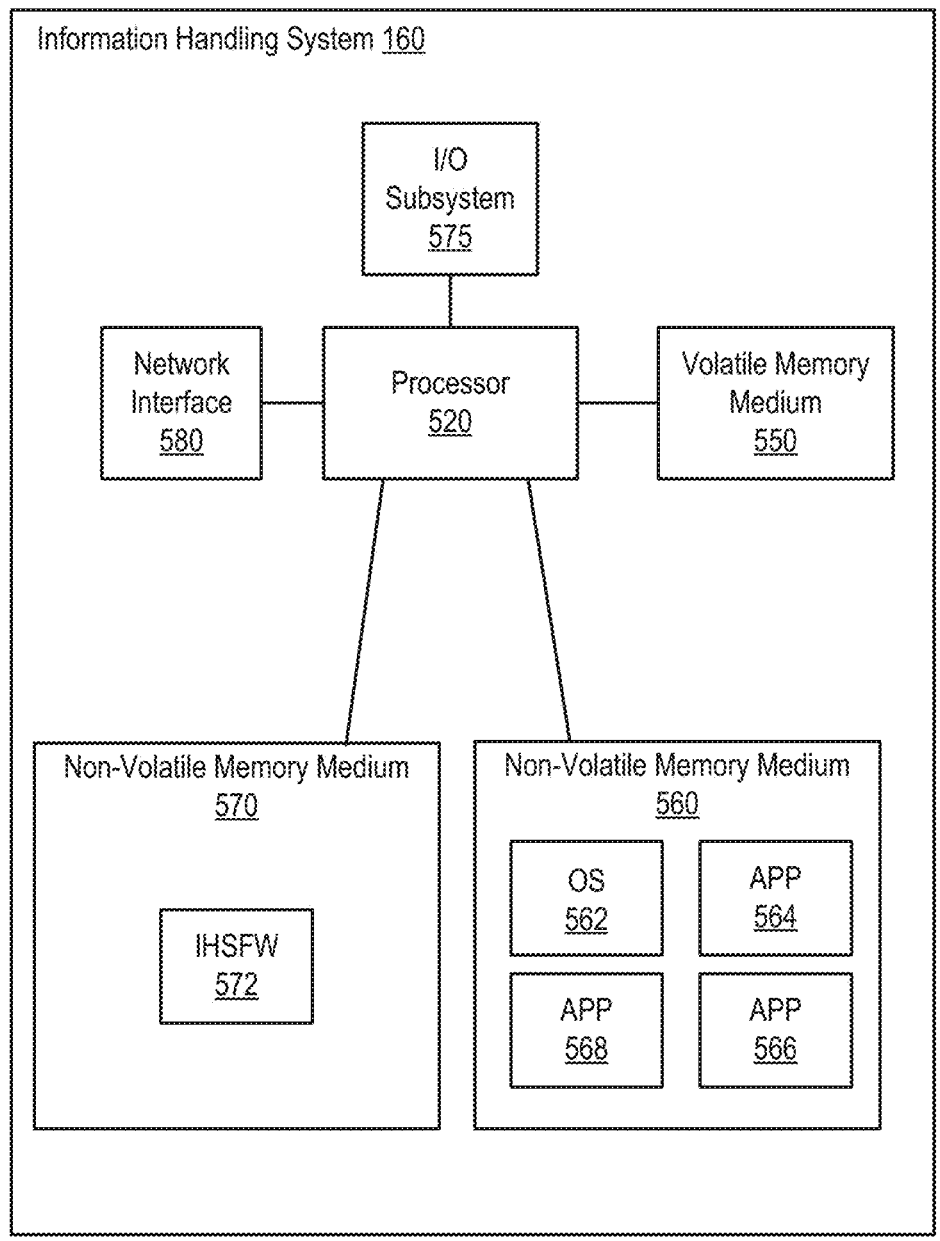
FIG. 5 illustrates an exemplary information handling system, according to one or more embodiments.

Turning now to FIG. 5, an exemplary information handling system is illustrated, according to one or more embodiments. IHS 160 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 160 may be a personal computer, a video conference system, a video processor system, a video system, a desktop computer system, a laptop computer system, a server computer system, a mobile device, a consumer electronic device, an electronic video player, or another suitable device and may vary in size, shape, performance, functionality, and price. In one or more embodiments, components of IHS 160 may include one or more storage devices, one or more communications ports for communicating with external devices as well as various input and output (I/O) devices, such as a keyboard, a mouse, and a video display, among others. In one or more embodiments, IHS 160 may include one or more buses operable to transmit communication between or among two or more hardware components. In one example, a bus of IHS 160 may include one or more of a memory bus, a peripheral bus, and a local bus, among others. In another example, a bus of IHS 160 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 160 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 160 may include a processor 520, a volatile memory medium 550, non-volatile memory media 560 and 570, an I/O subsystem 575, and a network interface 580. As illustrated, volatile memory medium 550, non-volatile memory media 560 and 570, I/O subsystem 575, and network interface 580 may be communicatively coupled to processor 520.

In one or more embodiments, one or more of volatile memory medium 550, non-volatile memory media 560 and 570, I/O subsystem 575, and network interface 580 may be communicatively coupled to processor 520 via one or more buses, one or more switches, and/or one or more root complexes, among others. In one example, one or more of volatile memory medium 550, non-volatile memory media 560 and 570, I/O subsystem 575, and network interface 580 may be communicatively coupled to processor 520 via one or more PCI-Express (PCIe) root complexes. In another example, one or more of an I/O subsystem 575 and a network interface 580 may be communicatively coupled to processor 520 via one or more PCIe switches.

In one or more embodiments, term "memory medium" may mean a "storage device", a "memory", a "memory device", "tangible computer readable storage medium", and/or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 5394 interface, a Thunderbolt interface, an advanced technology attachment packet interface (ATAPI), serial storage architecture (SSA), integrated drive electronics (IDE), or any combination thereof, among others.

Volatile memory medium 550 may include volatile storage such as, for example, RAM, DRAM (dynamic RAM), EDO RAM (extended data out RAM), SRAM (static RAM), etc. One or more of non-volatile memory media 560 and 570 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 580 may be utilized in communicating with one or more networks and/or one or more other information handling systems. In one example, network interface 580 may enable IHS 160 to communicate via a network utilizing a suitable transmission protocol and/or standard. In a second example, network interface 580 may be coupled to a wired network. In a third example, network interface 580 may be coupled to an optical network. In another example, network interface 580 may be coupled to a wireless network.

In one or more embodiments, network interface 580 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others In one or more embodiments, processor 520 may execute processor instructions in implementing one or more systems, flowcharts, methods, and/or processes described and/or illustrated herein. In one example, processor 520 may execute processor instructions from one or more of memory media 550-570 in implementing one or more systems, flowcharts, methods, and/or processes described and/or illustrated herein. In another example, processor 520 may execute processor instructions via network interface 580 in implementing one or more systems, flowcharts, methods, and/or processes described and/or illustrated herein.

In one or more embodiments, processor 520 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 520 may interpret and/or execute program instructions and/or process data stored locally (e.g., via memory media 550-570 and/or another component of IHS 160). In another example, processor 520 may interpret and/or execute program instructions and/or process data stored remotely (e.g., via a network storage resource).

In one or more embodiments, I/O subsystem 575 may represent a variety of communication interfaces, graphics interfaces, video interfaces, user input interfaces, and/or peripheral interfaces, among others. For example, I/O subsystem 575 may include one or more of a touch panel and a display adapter, among others. For instance, a touch panel may include circuitry that enables touch functionality in conjunction with a display that is driven by a display adapter.

As shown, non-volatile memory medium 560 may include an operating system (OS) 562, and applications (APPs) 564-568. In one or more embodiments, one or more of OS 562 and APPs 564-568 may include processor instructions executable by processor 520. In one example, processor 520 may execute processor instructions of one or more of OS 562 and APPs 564-568 via non-volatile memory medium 560. In another example, one or more portions of the processor instructions of the one or more of OS 562 and APPs 564-568 may be transferred to volatile memory medium 550, and processor 520 may execute the one or more portions of the processor instructions of the one or more of OS 562 and APPs 564-568 via volatile memory medium 550.

As illustrated, non-volatile memory medium 570 may include information handling system firmware (IHSFW) 572. In one or more embodiments, IHSFW 572 may include processor instructions executable by processor 520. For example, IHSFW 572 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 520 may execute processor instructions of IHSFW 572 via non-volatile memory medium 570. In another instance, one or more portions of the processor instructions of IHSFW 572 may be transferred to volatile memory medium 550, and processor 520 may execute the one or more portions of the processor instructions of IHSFW 572 via volatile memory medium 550.

In one or more embodiments, processor 520 and one or more components of IHS 160 may be included in a system-on-chip (SoC). For example, the SoC may include processor 520 and a platform controller hub (not specifically illustrated).

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   a processor; and
   a memory medium that is coupled to the processor and that includes instructions executable by the processor;
   wherein as the processor executes the instructions, the system:
   determine, at a first time, a first distance between a user and a camera system;
   determine that the first distance between the user and the camera system is greater than a threshold distance and in response, capture an image of the user using a single camera of the camera system, wherein distances less than the threshold distance correspond to distorted images of the user when captured by a single camera of the camera system;
   determine, at a second time, a second distance between the user and the camera system, the second distance less than the first distance;
   determine that the second distance between the user and the camera system is less than the threshold distance, and in response, transition from the single camera to utilize a first plurality of cameras of the camera system, including:
   receives a plurality of first video streams, each comprising respective images depicting the user, from a respective camera of the first plurality of cameras at respective ones of a plurality of first locations and having different viewing angles with respect to the user;

constructs, from multiple images in the plurality of first video streams, a single video stream comprising first forward-facing images in which the user is depicted as facing forward;

tracks a movement of the user from a first position proximate the plurality of first locations to a second position proximate a plurality of second locations;

receives, subsequent to tracking the movement of the user from the first position to the second position, a plurality of second video streams, each comprising respective images depicting the user, from a respective second plurality of cameras of the camera system at respective ones of the plurality of second locations and having different viewing angles with respect to the user; and constructs, from multiple images in the plurality of second video streams, second forward-facing images in the single video stream in which the user is depicted as facing forward.

2. The system of claim 1, wherein when the system tracks the movement the user, the system:

receives, at the first time, first sounds from the user;
receives, at the second time, second sounds from the user; and
determines a direction of the movement based on the first sounds received at the first time and the second sounds received at the second time.

3. The system of claim 1, wherein the system further:
provides, to a network, the single video stream constructed from the multiple images in the plurality of first video streams and the multiple images in the plurality of second video streams.

4. The system of claim 1, wherein when the system tracks the movement of the user, the system tracks a face of the user.

5. The system of claim 1, wherein when the system tracks the movement of the user, the system utilizes at least one of beamforming and spatial filtering.

6. The system of claim 1, wherein when the system tracks the movement of the user, the system utilizes at least one motion vector.

7. The system of claim 6, wherein when the system tracks the movement of the user, the system determines the at least one motion vector from a first image from a given video stream of the plurality of first video streams and a second image from the given video stream of the plurality of first video streams.

8. The system of claim 1,
wherein the plurality of first locations includes a first plurality of corners of a first screen that is proximate the user when the plurality of first video streams is captured by the first plurality of cameras; and
wherein the plurality of second locations includes a second plurality of corners of a second screen that is proximate the user when the plurality of second video streams is captured by the second plurality of cameras.

9. A method, comprising:
determining, at a first time, a first distance between a user and a camera system;
determining that the first distance between the user and the camera system is greater than a threshold distance, and in response, capture an image of the user using a single camera of the camera system, wherein distances less than the threshold distance correspond to distorted images of the user when captured by a single camera of the camera system;

determining, at a second time, a second distance between the user and the camera system, the second distance less than the first distance;

determining that the second distance between the user and the camera system is less than the threshold distance, and in response, transitioning from the single camera to utilizing a first plurality of cameras of the camera system, including:

receiving a plurality of first video streams, each comprising respective images depicting the user, from a respective camera of the first plurality of cameras at respective ones of a plurality of first locations and having different viewing angles with respect to the user;

constructing, from multiple images in the plurality of first video streams, a single video stream comprising first forward-facing images in which the user is depicted as facing forward;

tracking a movement of the user from a first position proximate the plurality of first locations to a second position proximate a plurality of second locations;

receiving, subsequent to tracking the movement of the user from the first position to the second position, a plurality of second video streams, each comprising respective images depicting the user, from a respective second plurality of cameras of the camera system at respective ones of the plurality of second locations and having different viewing angles with respect to the user; and constructing, from multiple images in the plurality of second video streams, second forward-facing images in the single video stream in which the user is depicted as facing forward.

10. The method of claim 9, wherein tracking the movement of the user includes:

receiving, at the first time, first sounds from the user;
receiving, at the second time, second sounds from the user; and
determining a direction of the movement based on the first sounds received at the first time and the second sounds received at the second time.

11. The method of claim 9, further comprising:
providing, to a network, the single video stream constructed from the multiple images in the plurality of first video streams and the multiple images in the plurality of second video streams.

12. The method of claim 9, wherein the tracking the movement of the user includes tracking a face of the user.

13. The method of claim 9, wherein the tracking the movement of the user includes utilizing at least one of beamforming and spatial filtering.

14. The method of claim 9, wherein the tracking the movement of the user includes utilizing at least one motion vector.

15. The method of claim 14, wherein the tracking the movement of the user includes determining the at least one motion vector from a first image from a given video stream of the plurality of first video streams and a second image from the given video stream of the plurality of first video streams.

16. The method of claim 9,
wherein the plurality of first locations includes a first plurality of corners of a first screen that is proximate the user when the plurality of first video streams is captured by the first plurality of cameras; and
wherein the plurality of second locations includes a second plurality of corners of a second screen that is proximate the user when the plurality of second video streams is captured by the second plurality of cameras.

* * * * *